United States Patent [19]

Saxena

[11] Patent Number: 5,634,985

[45] Date of Patent: Jun. 3, 1997

[54] METHOD FOR THE CONTROL OF SURFACE PROPERTIES OF MAGNESIUM PARTICLES

[75] Inventor: Surendra K. Saxena, Trondheim, Norway

[73] Assignee: Norsk Hydro a.s, Oslo, Norway

[21] Appl. No.: 527,347

[22] Filed: Sep. 12, 1995

[30] Foreign Application Priority Data

Aug. 16, 1995 [NO] Norway ................................. 943468

[51] Int. Cl.⁶ .................................................. C23G 1/28
[52] U.S. Cl. ............................ 134/40; 134/30; 134/32; 134/33; 134/42; 210/772; 210/781
[58] Field of Search ......................... 134/40, 42, 18, 134/30, 32, 33; 75/403; 210/770, 772, 781

[56] References Cited

U.S. PATENT DOCUMENTS

| | | | |
|---|---|---|---|
| 4,721,457 | 1/1988 | Areaux et al. | 432/58 |
| 4,910,334 | 3/1990 | Stuart et al. | 562/96 |
| 5,137,581 | 8/1992 | Takahashi | 134/21 |
| 5,300,154 | 4/1994 | Ferber et al. | 134/26 |
| 5,338,335 | 8/1994 | Saxena | 75/403 |
| 5,401,321 | 3/1995 | Hugo et al. | 134/11 |
| 5,505,786 | 4/1996 | Cole et al. | 134/2 |
| 5,522,940 | 6/1996 | Kitazawa et al. | 134/10 |

*Primary Examiner*—Long V. Le
*Attorney, Agent, or Firm*—Wenderoth, Lind & Ponack

[57] ABSTRACT

The invention concerns a method for control of the properties of the remaining oil layer on magnesium or magnesium alloy particles and/or other reactive metal particles produced from molten metal. The particles are cooled in a cooling oil with subsequent centrifuging and heating to remove remaining oil. A part of the oil layer on the particles is replaced with a lighter oil, preferably during centrifuging. The oil can be supplied as a spray. The light oil is supplied in an amount of 0.5–10 weight %. The light oil used should have a viscosity <5 cP at 25° C. and a flashpoint <100° C. Preferably it is used oils having a viscosity <2.5 cP and a flash point between 30° and 75° C. It is preferred to use dearomatized oil.

9 Claims, 1 Drawing Sheet

METHOD FOR THE CONTROL OF SURFACE PROPERTIES OF MAGNESIUM PARTICLES

BACKGROUND OF THE INVENTION

The invention concerns a method for the control of the properties of the oil layer for oil containing reactive metallic materials, particularly for magnesium or magnesium alloy particles such as granules, chips and turnings.

The normal oil cleaning/removal processes available on the market are based on chemical/mechanical cleaning principles involving use of some kind of reagent. There are two reagents commonly used for the said purposes; one reagent is usually from the tensides group, in particular ethene oxide group-type such as fatty alcohols or ethoxylate. The said reagents reduce surface tension of the oil with the result that the oil leaves the material and forms an emulsion in water. The problem in such a method lies in separation of oil from the oil and water mixture which is necessary before the washing filtrate is allowed to be drained/discarded in nature. Public health authorities demand such filtrate to contain less than 100 ppm of oil before it is to be discarded in drainage. By use of some special reagents and powerful agitation, it is now possible to separate out oil from the said materials as well as from the filtrate down below the limits, but it makes the oil removal process more complex and considerably costly. In addition, the process is not suitable for materials that can not sustain water. Unfortunately, magnesium is such a material and magnesium granules therefore in practice are defined as "danger when wet with water".

The other reagent is of solvent type which dissolves oils/mineral oils from the surface of the materials. In practice, the oil containing materials are treated/sprayed with an excess of solvent at various stages. For making the material practically free of the oil, use of reagents based on light dearomatized hydrocarbon such as heptane and/or methane are preferred. The reagents are then removed from the filtrate in a separate distillation process. However, use of such reagents is extremely dangerous with regard to fire as their flash points are rather low. Besides, these reagents have relatively high vapour pressure at room temperature which creates risk of environmental pollution inside the deoiling plant. In a few deoiling plants one has tried to use chlorinated hydrocarbon reagent; methyl chloride for avoiding danger of fire. Use of such reagent, however, involves the danger of serious pollution problems and is therefore not easily allowed by the local authorities.

In Norwegian patent No. 172 838 a new, effective and simple deoiling process particularly for the removal of oil from oil containing magnesium chips, turnings/magnesium fine materials has been described. The said process is based on removing the oil by evaporation during heating of the material to appropriate temperatures. The rich oil vapours arising in the process are condensed to recover the oil.

Another Norwegian patent application No. 931784 describes a process for the production of pure magnesium or magnesium alloy granules directly from molten metal. The said process produces oil containing metal granules from which oil has to be removed to extremely low level before the product can be sold on the market. For oil removal, one can of course use the above mentioned process described in Norwegian patent No.172838 where the material is first subjected to a centrifuge treatment to remove the excess oil and thereafter it is heated to reduce the oil concentration to very low levels, below 0.1%. However, as far as deoiling of the granules produced directly from liquid metal through the said process is concerned, the deoiling process described in the said patent may not be very effective. The reasons are:

The said granulation process of liquid magnesium is based on using a suitable oil bath as a cooling medium for liquid magnesium droplets. From the point of view of the metal granulation process, it is very important that the cooling oil has certain specific properties. The oil must be of non-polar type having very low concentration of aromatics both ordinary aromatics as well as polycrystalline aromatics. It must also have a relatively high flash point, preferably higher than 180° C., so as to avoid generation of flash from the oil surface, and it should have very low vapour pressure in the temperature range below 200° C. This is important for maintaining atmosphere above the oil bath practically free of oil vapours. The oil must also have reasonably good resistance to oxidation and decomposition so it can be used continuously in the process for a very long period. The oil should also have low viscosity, but since temperature of the oil bath during the liquid metal granulation goes up, the oil automatically acquires a satisfactory viscosity even if its viscosity at the room temperature is high.

There are optimum oils available on the market which are quite suitable to work as coolant "Quenching oils/Mineral oils" in the said magnesium granulation process, but unfortunately, these oils are rather difficult to remove from the final product down to the required low concentrations. The reason is that for effective deoiling through the said heating process, the oil should have relatively high vapour pressure at moderate temperatures and it should preferably have low viscosity at room temperature. The latter one is of importance in the centrifuge treatment and it affects the content of remaining oil in the centrifuged material. Unfortunately, the fact is that the oil properties which are optimum from the point of view of the deoiling process are less attractive in oils to be used as a coolant in the said granulation process. The said quenching- and mineral-oils have low vapour pressure and high boiling point with the result that the granules require heating to rather high temperatures. Heating of magnesium- and magnesium alloy granules to high temperatures is dangerous from the point of view of safety and product quality. In addition, use of rather high temperatures make the whole deoiling process complex, energy consuming and costlier. The above problems give rise to two options; 1) to make a compromise and choose an oil with properties lying in between the quenching oil and light oil. 2) Another way is to choose a deoiling process which is insensitive to or which can accept the properties of the optimum cooling oil, for example a solvent extraction process involving risk of safety and serious environmental problems. In any case, one would be forced to deviate from the optimum and most practical and economical solutions.

SUMMARY OF THE INVENTION

The object of the invention is to solve the above mentioned problems so as to provide in the said magnesium granules production process an optimum coolant oil bath as well as to create optimum conditions in the deoiling process based on heating. Another object of the invention by the method described below is to allow production of practically oil-free magnesium granules directly from molten metal more effectively, with low energy consumption and with practically no pollution and/or environmental problems.

These and other objects of the invention are obtained by the method as described below, and the invention is further characterized and described in the patent claims.

The invention concerns a method for control of the properties of the remaining oil layer on magnesium or magnesium alloy particles and/or other reactive metal particles produced from molten metal. The particles are cooled in a cooling oil with subsequent centrifuging and heating to remove remaining oil. The oil layer on the particles is subjected to treatment with a lighter oil.

DETAILED DESCRIPTION OF THE INVENTION

Figure 1:
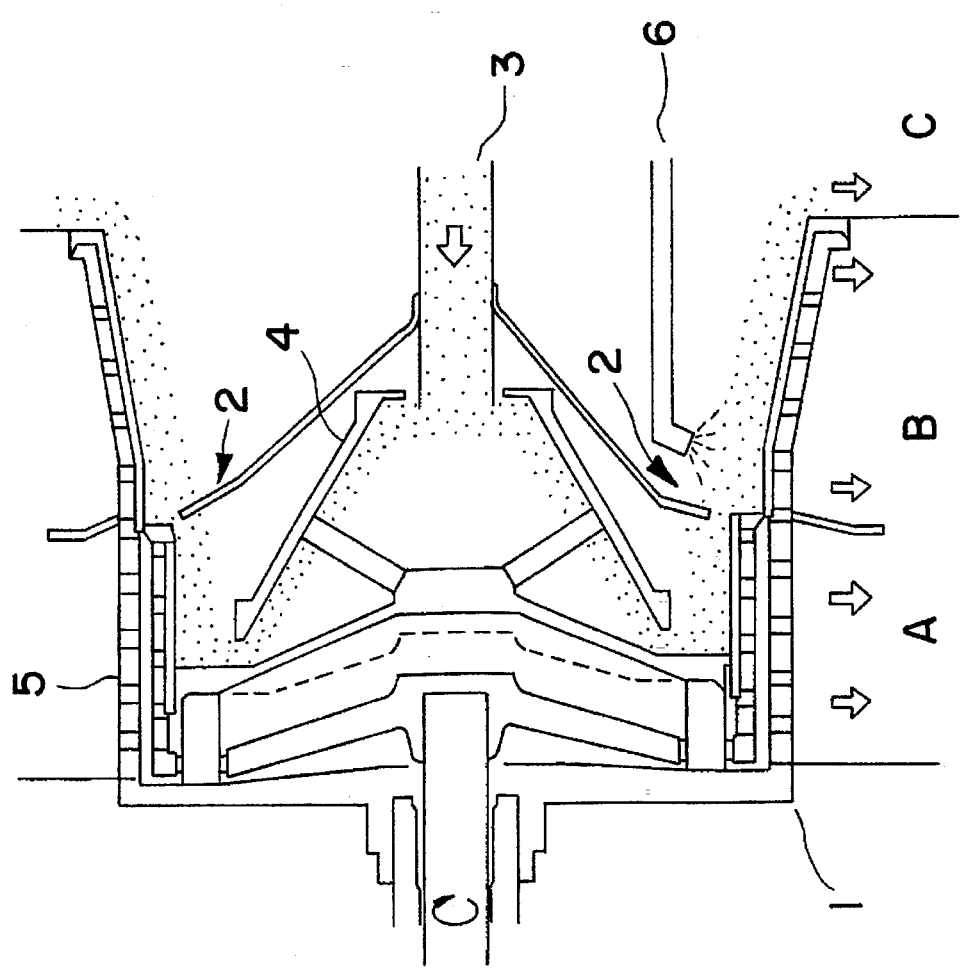
FIG. 1 shows a centrifuge which can be used in conducting the method of the present invention.

The treatment in accordance with the present invention is carried out after the mother liquor has been separated off, preferably during centrifuging. The oil can be supplied as a spray. The light oil is supplied in an amount of 0.2–7 weight %. The light oil used should have a viscosity <5 cP at 25° C. and a flashpoint <100° C. Preferably use is made of oils having a viscosity <2.5 cP and a flash point between 30° and 75° C. It is preferred to use dearomatized oil.

The oily magnesium or magnesium alloy particles are fed to a centrifuge containing a basket enclosed by a product housing subdivided into at least three chambers (A,B,C) for the separate discharge of mother liquor, light oil and solids. Most of the liquid is centrifuged off through sieve openings in a feed zone of the interior basket. The particles retaining an oil layer of the original coolant oil, are led to a second zone where they are subjected to a spray of light oil whereafter the centrifuged solids are led out of the centrifuge.

The invention will be further described with reference to the drawing, FIG. 1, which describes a centrifuge which can be used to carry out the invention.

In practically all the deoiling processes, the starting oil containing material is first subjected to a centrifuge treatment for the removal of excess oil or mother liquor. This is important from two points of view; 1) to reduce oil load in the main deoiling treatment and 2) to recover the useable prime oil. Also in case of deoiling processes based on using chemical reagents for creating an oil and water emulsion, extremely extensive washing operation is carried out some time in the centrifuge. Thus, the product housing of the centrifuge in this case is subdivided into chambers for separate discharge of mother liquor and washing filtrate. The solids coming out of the centrifuge in these cases are, although wet, practically free of oil.

The method according to the invention is based on using a centrifuge for controlling the properties of the oil layer on the magnesium granules. Commercially available centrifuges can be used, where the product housing is either already subdivided into two or more chambers or the housing can be modified to create two or more chambers for separate discharge.

A centrifuge which is suitable for the operation is shown in FIG. 1. A basket 1 is enclosed by the product housing (not shown) which is subdivided into 3 chambers A,B,C for the separate discharge of mother liquor (cooling oil), filtrate (light oil, cooling oil) and solids. A partition wall 2 separates the two first chambers. The oleaginous magnesium particles are fed through the inlet pipe 3 into the feed funnel 4 which rotates with the same speed as the basket. Most of the liquid is centrifuged off through the sieve openings 5 in the feed zone of the interior basket. In the first chamber the mother liquor from the starting magnesium granules is separated out. This oil can be reused as cooling oil.

In the second chamber, the magnesium granules retaining an oil layer of the original coolant oil are subjected to spray of limited quantity of light oil. The light oil is fed through a pipe 6 in the range of 0.5–10 weight % for changing the nature of the residual oil layer on the particles. By choosing the type and quantity of the light oil, one can control properties of the final oil layer remaining on the product in such a way that the granules could be easily made oil-free in the said de-oiling process based on heating. The method according to the invention changes not only properties of the oil remaining on the magnesium granules, but it also reduces the content of the oil in the centrifuged product. This is because the light oil spray dissolves/mixes with the original coolant oil layer on the solids with the result that the final mixture acquires a reasonably low viscosity at room temperature. Thus, the centrifuged product contains much less oil than that in a centrifuged product without the light oil spraying treatment. The remaining oil after the treatment is centrifuged off through the sieve openings and led to chamber B. A great advantage of using these light oils is that the spraying filtrate can be used directly as fuel oil without any troublesome precautions in any ordinary heating furnace. The amount and type of oil used determines the temperature to be used in the final deoiling process steps.

The solids are automatically or stepwise discharged from the centrifuge. Other types of centrifuges could also be used.

The method according to the invention can use a number of light oils down to heptane, as shown in Table 1. However, taking into consideration the pollution and safety risk, use of light oils of types corresponding to the listed oils from Exxon, Exxsol D60, D70 and/or D80 is preferable. If precaution arrangements are made the method can even use a predetermined quantity of heptane to control properties of remaining oil layer on the said solid particles.

TABLE 1

| Properties | | Exxsol* D80 | Exxsol D70 | Exxsol D60 | Exxsol D40 | Heptane |
|---|---|---|---|---|---|---|
| Density kg/dm$^3$ at | 15° C. | 0.799 | 0.79 | 0.788 | 0.771 | 0.713 |
| Viscosity cP at | 25° C. | 2.07 | 1.42 | 1.29 | 0.96 | 0.35 |
| | 40° C. | 1.64 | 1.15 | 0.99 | 0.74 | — |
| | 100° C. | 0.52 | — | 0.46 | 0.36 | — |
| Boil starts–finish | $T_s$–$T_f$°C. | 199–237 | 193–213 | 182–125 | 155–188 | 94–99 |
| Flashpoint °C. | | 75 | 72 | 62 | 40 | <0 |
| Aromatic content wt % | | <0.1 | <0.1 | <0.1 | <0.1 | <0.001 |
| Evaporation rate (Ether = 1)DIN 53170 | | 0.002 | 0.006 | 0.007 | 0.018 | 0.31 |
| Surface tension mN/m | | 26.7 | 26.4 | 24.9 | 24.4 | 20.3 |

*Produced by EXXON

The method according to the invention is quite distinct as its primary aim is to change properties of the oil remaining on the granules to an optimum for the deoiling process based on heating. The said method is not to be mixed with the standard deoiling methods based on use of chemical reagents or a solvent extraction. These methods straight away make the material practically free of oil and at the same time generate enormous amount of washing filtrate or oil-solvent mixture. The magnesium granules/particles in the method according to the invention retain—even after the light oil spraying and centrifuge treatment—a considerable amount of oil which needs to be removed through a further treatment. In contrast to the standard method, the said method does not generate any excess amount of filtrate and the filtrate itself does not cause any environmental problems. The method according to the invention changes properties of the remaining oil layer so that the final products can be made practically free of oil in the temperature range between 150°–300° C. and preferably around 200°–250°. The light oils used in the method are of the types which are practically hazardless and which do not create any environmental/pollution problems. Due to use of small quantity of light oil spray, the treatment filtrate coming out in the process is so little and so safe that it can be directly used as a fuel oil in any industrial oil fired furnace.

The method according to the invention changes not only properties of the oil remaining on the granules, it also reduces the content of oil in the centrifuged material to a lower level; consequently, oil load in the subsequent deoiling process based on heating is considerably reduced. The type and shape of magnesium materials and its oil concentration before the light oil spraying as well as amount and type of light oil used, decide the final oil content in the material. For practically round granules, the final oil concentration can be reduced to about 0.5% whereas in the case of porous and long magnesium chips/turnings, the material can retain 1–6% of oil. This is the case when the amount of light oil sprayed on the material is in the range between 0.5–10%. The method according to the invention does not aim to reduce oil concentrations in the material below 0.5%. Main aim of the method according to the invention is to optimize the properties of the oil layer remaining on the granules and not to reduce the oil or to make the material completely oil-free by spraying the light oil.

Consequently, the quantity of light oil sprayed on the granules affects the heat-treatment temperature while the remaining oil concentration on the granules affects only the treatment time.

Several experiments were carried out to illustrate the process.

EXAMPLE 1

Magnesium granules were produced according to the process as described in Norwegian patent application No. 931784. The product was sieved to a size <4 mm. Three separate batches A,B and C were produced. In Table 2 the content of oil remaining in the magnesium granules is shown before and after the centrifuge treatment without spraying of any light oil. The product was centrifuged for 10 minutes.

TABLE 2

| Granules type | Oil % Before the centrifuge treatment | Oil % After the centrifuge treatment (2000 rpm) |
| --- | --- | --- |
| A | 6.37–8.1 | 2.5–3.2 |
| B | 3–4.5 | 1.43–2.6 |
| C | 2.5–3.2 | 1.15–1.5 |

The difference in oil content between the types A, B and C reflects different shape and roughness of the granules. The granules were thereafter sprayed with a light oil and centrifuged for 10 minutes. The oil content was measured. In Table 3 the results from the experiments are shown.

TABLE 3

| Trial | Granules type | Light oil (%) (D60) | r.p.m. in the centrifuge | Time (min) | Remaining oil % |
| --- | --- | --- | --- | --- | --- |
| 1 | C | — | 2000 | 10 | 1.2 |
| 2 | C | 0.5 | 2000 | 10 | 0.81 |
| 3 | C | 1.0 | 2000 | 10 | 0.76 |
| 4 | B | — | 2000 | 10 | 1.5 |
| 5 | B | 0.5 | 2000 | 10 | 1.13 |
| 6 | B | 1.0 | 2000 | 10 | 0.81 |
| 7 | B | 1.5 | 2000 | 10 | 0.78 |

As can be seen from the table, the remaining oil in the granules is reduced after treatment with a light oil.

EXAMPLE 2

Experiments were also carried out including heating of the granules. In Table 4 the contents of oil remaining in the representative granule samples are shown after heat treatment at different temperatures. The objective is to reduce the heat treatment temperature to about 250° C. As can be seen from the table, a material without treatment with light oil must be heated until 300° C. to obtain an oil content of 0.1%. By treating the same granules (BI) with 1.25% light oil the same is obtained at 250° C. By a treatment with 2.0% light oil (BII), the same oil concentration can be obtained with heating to 220° C. For samples centrifuged at 2500 rpm, it can be seen that the oil content is less, but that the treatment temperature will be the same as in the earlier experiments.

EXAMPLE 3

About 1 kg of oil-contaminated magnesium chips of the type described in Norwegian patent No. 172838, were first effectively centrifuged at 2750 rpm for about 15 minutes. The chips are of variable shape having a size in the order of 0.1–30 mm. Afterwards, the chips were subjected to the light oil treatment, spraying of about 4 weight % light oil and then centrifuging the material again at 2750 rpm for 15 minutes. The content of the oil in the chips after the first centrifuge treatment was about 4.30 weight %. The treatment of the light oil changed not only the properties of the remaining oil layer, but it decreased also the oil concentration to about 2.2 weight %. The light oil treated magnesium chips were finally subjected to the deoiling treatment through heating at 240° C., 280° C. and 320° C. respectively. The said light oil treatment resulted in that the oil content of the chips after the deoiling at 280° C. came down from 2.2% to 0.09%. Deoiling at 320° C., decreased the oil concentration to about 0.02%. Comparing these results with those described in the Norwegian patent, one can see an appreciable improvement.

According to the Norwegian patent it was necessary to use a heat treatment for 10 minutes at 370° C. to reduce the oil content to 0.1%. The temperature of the deoiling treatment of the magnesium chips can be reduced by about 70° C. This is of great advantage not only from the point of view of process economy, but also from the point of view of safety as many magnesium alloys chips have as low melting point as 410° C.

TABLE 4

| Material | Oil % at start | Oil concentration (%) after heat treatment | | | | | | | |
|---|---|---|---|---|---|---|---|---|---|
| | | 150° C. | 200° C. | 210° C. | 220° C. | 230° C. | 250° C. | 300° C. | 350° C. |
| B, 0% D60 | 1.53 | — | — | — | — | — | 0.70 | 0.1 | 0.05 |
| BI, 1.25% D60 | 0.86 | 0.83 | 0.57 | — | — | — | 0.1 | 0.005 | — |
| BII, 2.0% D60 | 0.62 | — | 0.437 | 0.21 | 0.06 | 0.042 | 0.021 | — | — |
| B*, 0% D60 | 1 | — | — | — | — | — | 0.53 | 0.1 | 0.01 |
| B*II, 2% D60 | 0.58 | — | 0.42 | — | 0.05 | — | 0.03 | — | — |

B* and B*II Granules material in this case was centrifuged at 2500 rpm

I claim:

1. A method for removing oil remaining on magnesium or magnesium alloy particles produced from molten metal which is cooled in a cooling oil, which method comprises centrifuging said particles, and subsequently heating said particles to remove remaining oil, wherein a second oil having a viscosity and boiling point lower than the viscosity and boiling point of said cooling oil is added to said particles having said cooling oil thereon.

2. The method according to claim 1, wherein said second oil is added to said particles during centrifuging.

3. The method according to claim 2, wherein said second oil is sprayed on said particles.

4. The method according to claim 1, wherein 0.5–10 weight % of said second oil is added to said particles.

5. The method according to claim 1, wherein said second oil has a viscosity of less than 5 cP at 25° C. and a flashpoint of less than 100° C.

6. The method according to claim 5, wherein said second oil has a viscosity less than 2.5 cP and a flashpoint between 30° and 75° C.

7. The method according to claim 3, wherein said second oil is a dearomatized oil.

8. The method according to claim 1, wherein oily magnesium or magnesium alloy particles are fed to a centrifuge containing a basket (1) enclosed by a product housing subdivided into at least three chambers (A,B,C) for the separate removal of said cooling oil, said second oil and particles, and wherein the majority of said cooling oil is removed through sieve openings (5) in a feed zone of an interior basket, the particles retaining an oil layer of said cooling oil are led to a second zone where said particles are sprayed with said second oil and where filtrate is removed, whereafter the treated particles are led out of the centrifuge.

9. The method according to claim 8, wherein said particles are discharged automatically or batchwise.

* * * * *